United States Patent [19]

Pacileo

[11] Patent Number: 5,185,513
[45] Date of Patent: Feb. 9, 1993

[54] HEAT CONTROLLER AND METHOD FOR HEAT TREATMENT OF METAL

[75] Inventor: Stephen P. Pacileo, Friendswood, Tex.

[73] Assignee: PR Partners, Pasadena, Tex.

[21] Appl. No.: 497,436

[22] Filed: Mar. 22, 1990

[51] Int. Cl.⁵ .............................................. H05B 1/02
[52] U.S. Cl. .................... 219/497; 219/505; 219/549; 219/535; 219/494; 228/231; 228/119; 228/232
[58] Field of Search ............... 219/50, 550, 497, 494, 219/501, 505, 506, 535, 508, 549; 228/119, 231, 232

[56] References Cited

U.S. PATENT DOCUMENTS

| | | | |
|---|---|---|---|
| 3,036,187 | 5/1962 | Goldstaub et al. | 219/550 |
| 3,851,148 | 11/1974 | Schonert et al. | 219/497 |
| 4,611,744 | 9/1986 | Fraser et al. | 228/119 |
| 4,613,744 | 9/1986 | Fraser | 219/550 |
| 4,701,589 | 10/1987 | Larsson | 219/50 |

OTHER PUBLICATIONS

Cooperheat Technical Information (Exerpts) May, 1972.
Kemppi Classics Advertising Brochure (date unknown).
Kemppi PS 3500/PS 5500 Inverter Power Supplies—Advertising Brochure (date unknown).
Kemppi PS 2800 Inverter Power Supply-Advertising Brochure (date unknown).

*Primary Examiner*—Mark H. Paschall
*Attorney, Agent, or Firm*—Vaden, Eickenroht, Thompson, Boulware & Feather

[57] ABSTRACT

Method and apparatus for increasing the efficiency and safety of conducting heat treating operations with conventional welding equipment by eliminating mechanically-operated contacters. The apparatus operates on low power and produces low power level signals and controls power sources capable of producing high power levels for both welding operations and powering a heating element for heat treatment. The signal produced by the apparatus reflects a difference between an operator-selected desired temperature and the actual temperature of the workpiece and is current limited to a level proportional to the operator-selected desired power level of the welding power source to control the rate at which the heating element connected thereto heats the workpiece.

20 Claims, 1 Drawing Sheet

HEAT CONTROLLER AND METHOD FOR HEAT TREATMENT OF METAL

BACKGROUND OF THE INVENTION

The present invention relates to an apparatus and method for controlling the heating of metal such as for pre-weld or post-weld heat treatment, stress relief, or for controlling the heating of metallic conduits and containers to prevent the freezing and improve the fluidity of materials contained therein. In more detail, the present invention relates to an apparatus which controls an applications power supply for heating a workpiece to a desired temperature at a desired rate without passing the power produced by that power supply through that apparatus as well as a method of controlling that power supply to achieve that same result.

The importance of heating metal before, during, and/or after welding is well documented. Preheating, a term used to describe heating both prior to and during welding, helps prevent the terminal strains set up during welding that can crack the weld, protects against the high thermal conductivity of, for instance, relatively thick carbon steel which causes heat loss from the welded area, increases the diffusion rate of crack-promoting hydrogen, facilitates removal of hydrogen from a welded joint, and drives off harmful moisture. Postheating, or post-weld heat treatment, relieves residual stresses in the weld due to the restraint by the parent metal during weld solidification to provide increased ductility in the weld metal and a decrease in hardness, improves corrosion resistance and resistance to caustic embrittlement, and improves machining stability. Recognition of the importance of heat treating throughout the metal-working and fabrication industry has given rise to a whole industry in which companies specializing in heat treatment render, for instance, on-site heat treating services on a contract basis during, for instance, the construction of bridges, refineries, nuclear reactors, and other structures which must be welded.

In spite of the availability of these contract services and the recognized importance of heat treatment, there remains a large number of welds that are not heated, pre- or post-weld, or which are not effectively heat treated, because of the cost of such treatment, a lack of necessary equipment, or because such treatment is deemed unnecessary because the metal joint has been "over-engineered", e.g., made of metals that are so much stronger/durable than is required by the particular application that they are strong enough to meet specifications even after they are weakened by the weld. It is to these latter wasteful efforts that the present invention is directed in that an apparatus and method are provided that are so relatively inexpensive to purchase and easy to operate that heat treatment is brought within the means and capabilities of any legitimate welder and/or fabricator.

Another goal of the present invention is to provide an apparatus for use in heat treatment that operates in conjunction with the equipment which is commonly used for welding and/or heat treating metals.

Another goal of the present invention is to provide a method of using the equipment which is commonly used for welding and/or heat treating metal.

Another goal of the present invention is to provide an apparatus and method by which the rate at which the metal is heated is controlled, again with commonly used welding equipment.

Another goal of the present invention is to provide an apparatus for heating metal which is light in weight and small, thereby facilitating the transport of the apparatus.

Another goal of the present invention is to provide an apparatus and method for use in conjunction with the equipment commonly used for welding and/or heat treating metals which controls the power output of such equipment at two selected power levels for pulsed operation.

Another goal of the present invention is to provide an apparatus and method for controlling the heating of metal to prevent freezing or improve the fluidity of materials contained within a metallic component such as a tank or pipeline.

A particularly important goal of the present invention is to provide a method and apparatus by which a metallic workpiece is heated to a desired temperature at a desired rate without passing the power used to heat the workpiece through the circuitry used for controlling the power supply, thereby increasing the safety of that equipment.

Other goals, and the advantages, of the present invention will be made clear by the following description of a presently preferred embodiment thereof.

SUMMARY OF THE INVENTION

In a first aspect, the present invention is directed to an apparatus for controlling the heating of a metallic workpiece to a desired temperature comprising a means for sensing the temperature of the metallic workpiece that outputs a signal proportional to that temperature, a first connector for receiving input power from an external power source, and means operating on the power received from that first connector for receiving the output signal from the temperature sensing means and outputting a signal responsive to the difference between a desired temperature, which is operator selected, and the temperature sensed by the sensing means. That difference signal is used to turn an applications power supply, e.g., a rectifier, inverter, or other power source, for powering a heating element, on and off. Means is provided for limiting the current of the difference signal that outputs a current limited signal proportional to the desired power level, also operator selected, of the applications power supply to control the rate of heating of the metallic workpiece by the heating element, the current limited signal being transmitted to the applications power supply by a second connector.

In another aspect, the present invention is a method for controlling the heating of a metallic workpiece to a desired temperature comprising the steps of selecting a temperature to which it is desired to heat the workpiece, sensing the temperature of the workpiece, and comparing the sensed temperature of the workpiece to the desired temperature. If the sensed temperature is greater than the desired temperature, a signal is output and then current limited so that the current level is proportional to the desired power level of an applications power supply. The current limited output signal is then output to the applications power supply to switch the applications power supply on to heat the workpiece.

DETAILED DESCRIPTION OF THE PREFERRED EMBODIMENT

Figure 1:
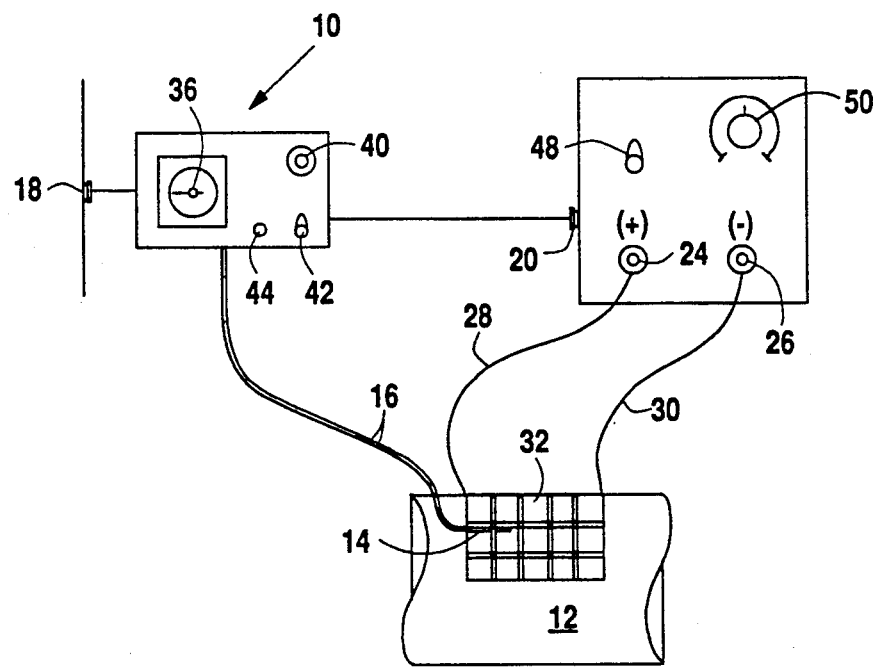
FIG. 1 depicts a representative system including the apparatus of the present invention.

Welding operations require a fairly healthy capital investment in equipment, and the equipment required for even modest welding capabilities is fairly substantial in size, and especially in weight, which therefore necessitates additional investment in transport equipment. Even with the relatively recent widespread availability of reliable and efficient light-weight power inverters, on-site welding requires a power source such as a gasoline or diesel powered generator, a rectifier or inverter, various control equipment depending upon the type of welding, cables, and so on. If the welder also expects to heat treat, various finger elements, ceramic pad heaters, braided heaters, or other heating elements, connectors, control boxes, cables and, in many cases, power sources, may also be required.

It is now fairly common to use a common power supply, operating off of a generator, to supply power for both heat treating and actual welding operations (hence, the use of the phrase "applications power supply" throughout this specification) such that at least some duplication in equipment has been eliminated. However, regardless of whether the applications power supply is used for heat treatment or welding, it is generally considered to produce power at levels sufficient to be considered dangerous if not used properly even at relatively modest output capabilities. The power levels required for welding (e.g., from as few as about 2–5 amperes at about 10 volts up to as high as several thousand, or even 10,000, amperes at, for instance, 80 volts for certain types of welding) and heavy loads which the various types of resistive heaters used for heat treatment present to the applications power supply require that the applications power supply be a source of what can be termed "high power" for the purposes of this specification. These high power sources are, of course, part of a circuit when used for heat treating, and turning them on and off to control the temperature to and the rate at which the workpiece is heated requires a switch which opens or closes the circuit through which that high power current is routed.

Such switches are contained in a controller, many of which can be characterized as a metal box in which a contacter is located for closing the circuit to the welding tip and/or heating element. These contacters are generally considered to be the weakest link in the circuit because they are the most likely part of the circuit to fail. They are necessarily large (to handle, for instance, 80 volts at 500 amperes, they must be) and one pole is always "live". It is not uncommon for the live contacter to ground out against the metal control box; another relatively common occurance, when a contacter fails, is that the contacter fuses closed such that there is no way to turn the circuit off.

Adding to these difficulties with such equipment is the fact that the control box, having the contacter located therein, represents a spark gap which, because of the deposition of splash over time, increases in size. Explosions and fires on industrial sites as a result of welding and/or heat treating operations are, unfortunately, a relatively common occurrence, and this spark gap is probably the source of more such accidents than any other single component welding equipment.

In addition to these safety problems, because the contacters are expensive (even a small contacter may cost the contractor $75–90, most are in the $300–400 range, and large contacters may cost up to $1500), they are usually sized to the job; in other words, a much larger contacter is used in a contacter box on a job requiring 80 volts at 500 amperes than a job requiring 40 volts at 200 amperes. It is common to use the same contacter box (within certain power ranges) and switch out the contacters. Predictably, the used contacters end up being thrown into a box, and after several jobs, the welding contractor accumulates a wide assortment of used, but still usable, contacters. A problem arises when used contacters are subsequently re-used on jobs for which they may not be properly sized, thereby creating a safety hazard. The method and apparatus of the present invention eliminate the contacter box and the attendant safety problems from the circuit, and as noted above, the primary goal of the present invention is to increase the safety of using an applications power supply.

A controller, indicated generally at reference numeral 10, constructed in accordance with the present invention is shown in FIG. 1, which represents a system suitable for heat treating workpiece 12. The system includes a temperature sensing means such as a thermocouple or other temperature sensor 14 as are well-known in the art connected to controller 10 by a pair of leads 16 for sensing the temperature of workpiece 12 and outputting a signal proportional thereto. Controller 10 is provided with a first connector, indicated generally at 18, for receiving input power from an external power source (not shown), normally either 120 or 240 volt, single phase, and second connector 20 for transmitting an output signal therefrom to an applications power supply 22. Applications power supply 22 is, for instance, a conventional rectifier or voltage inverter having positive and negative terminals 24 and 26, respectively, to which cables 28 and 30 are connected for powering a heating element such as a ceramic heating pad 32. Applications power supply 22 likewise receives input power from an external source (not shown) or primary line, such as a generator, normally supplying 120/240 volt, single phase current or 240–575 volt, three phrase current.

Figure 2:
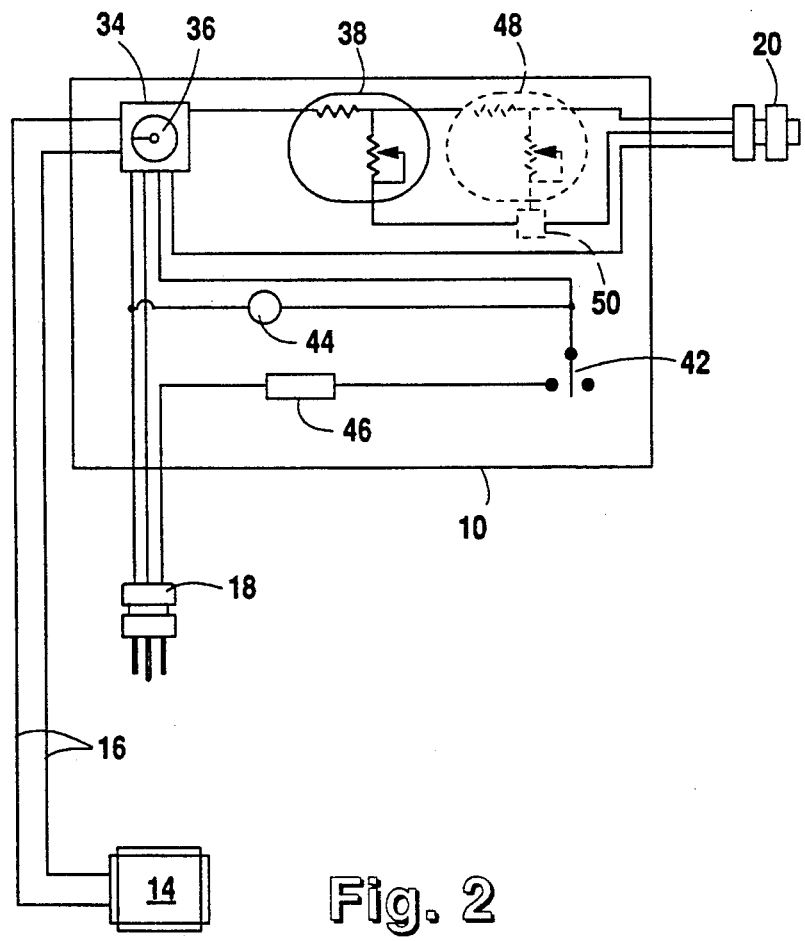
FIG. 2 is a schematic diagram of a presently preferred embodiment of an apparatus constructed in accordance with the present invention.

Referring now to FIG. 2, the controller 10 is shown in more detail. In a presently preferred embodiment, controller 10 includes two major components, the first of which comprises means operating on the power received from an input power cable, or first connector 18, which receives the signal from temperature sensing means 14 and outputs a signal responsive to the difference between a desired temperature and the temperature sensed by sensing means 14 in the form of, for instance, a temperature sensor/controller, or comparator 34. Temperature sensor/controller 34 outputs a signal responsive to the difference between a desired temperature selected by the operator with control knob 36 thereof and the temperature sensed by thermocouple 14 through second connector 20 to turn applications power supply 22 on and off. In a presently preferred embodiment, comparator 34 comprises a Honeywell "DIAL-A-PACK" controller, but those skilled in the art who have the benefit of this disclosure will recognize that other similar controllers will function equally well for this intended purpose. Controller 10 is optionally provided with a timer for manually determining a time at which heating operations are to begin.

The second major component of controller 10 comprises means for limiting the current of the signal output from temperature sensor/controller 34 that, in turn, outputs a current limited signal proportional to a desired power level of the applications power supply 22 to control the rate of heating of the metallic workpiece by heating element 32. This current limiting means, in a presently preferred embodiment, takes the form of a potentiometer 38, having output power knob 40 (see FIG. 1) calibrated in percentage power output of the applications power supply 22, for selection of the desired power level of the applications power supply 22 by the operator. The current limited output signal of potentiometer 38 is then transmitted to applications power supply 22 through second connector 20. Means is optionally provided, in the form of a second potentiometer 48 and interval timer-controlled switch 50 (both shown in shadow lines in FIG. 2 because they are optional) for switching back and forth between circuits including potentiometer 38 and potentiometer 48 at selected time intervals, or frequency, to pulse the power output of applications power supply 22 from a first power level to a second power level. As is apparent to those skilled in the art from the forgoing description, appropriate control or selector knobs (not shown) are provided for selecting the second power level using potentiometer 48 and the frequency with which switch 50 switches back and forth between potentiometer 38 and potentiometer 48. As shown in FIG. 2, controller 10 is also provided with an on/off switch 42, "power on" indicator lamp 44, and re-settable ground fault fuse 46, all as known in the art.

Connector 20, in a presently preferred embodiment, is an amphenol-type and plugs directly into certain commercially available applications power supplies which are provided with input jacks for remote controllers used during welding operations. For instance, the Model MP 1500, 2800, 3500, and 5000 power inverters available from Kemppi Inc. (Mentor, Ohio) all include an input jack for such an amphenol-type connector into which, for instance, a Kemppi C100C remote control is plugged for stepless adjustment of current ranges and/or pulse ratio during welding operations. Such remotes include controls that duplicate the percentage power output selector knob 50 of applications power supply 22, and output power knob 40 of potentiometer 38 of controller 10 of the present invention effectively functions in place of selector knob 50. Although not limited to use solely with an inverter or solid state power supply, there are advantages to using controller 10 of the present invention with such power supplies, specifically, electronic power control on the primary side and electronic regulation with low power control. By using other connectors and/or adapters (not shown), controller 10 of the present invention is used for heat treatment with any applications power supply that includes a remote control input jack.

As noted above, controller 10 is powered by an external power source. That external power source can be powered by a battery, 120 or 240 volt 50/60 Hz single phase source, or other readily available power source as is known to those skilled in the art who have the benefit of this disclosure, when combined with the proper converter and/or other circuitry for operating on that power source. As is clear from the preceding description, the power levels on which controller 10 operates, and the output signal thereof, are but a fraction of the power levels which some applications power supplies are capable of producing. Such low power levels, along with the elimination of a control box including the contacters, make the use of the controller 10 for operating an applications power supply much safer than the manner in which conventional power supplies are used for heat treatment. Further, the added convenience of the automatic on and off cycling of applications power supply 22 under the influence of controller 10 once the sensed temperature and the desired temperature are equal, greatly facilitates proper heat treatment.

In an alternative embodiment (not shown), the temperature sensor/controller, or comparator, 34 is replaced by a programmable timer. Such a programmable means allows the operator to begin operations at a predetermined time to heat metal to a desired temperature at a desired rate, both the desired temperature and the rate of heating (e.g., percentage power) being predetermined and programmed into such a device, as well as the time of commencement of operations. Regardless of whether a programmable means is provided, the present invention optionally contemplates the use of a chart recorder for monitoring the temperature of the metal, lapsed time of operation, and/or the duty cycle of applications power supply 22 as a function of time as known in the art.

Referring again to the figures, the method of the present invention will now be described. If, for instance, it is desired to preheat a weld joint between chrome/molyodenom steel, four inch O.D., W.T. 0.5 inches, the interpass temperature during welding would be between about 375° and 700° F. Controller 10 is operated, for instance, from a 120 V AC, 50/60 Hz single phase outlet, and a power inverter such as the Kemppi model MP 1500 inverter type power supply is connected to a 220 V AC, 50/60 Hz single phase primary source. Two heating pads are attached to workpiece 12, one on each side of the joint about four to six inches from the centerline of the joint as is shown for heating element 32 in FIG. 1. Ceramic fiber insulation is then affixed around each heating pad and thermocouple 14 is inserted between one of the heating pads and the weld joint.

The pair of leads 16 of thermocouple 14 is connected to controller 10 and positive and negative terminals 24 and 26 of the inverter are connected to the heating pads using two dual splitters (not shown). Second connector 20 is connected to the remote input jack on applications power supply 22, and the appropriate switch (not shown) on that applications power supply 22 is positioned for remote operation. Using selector knob 36 of controller 10, the desired temperature is set at between about 357° and 700° F., and selector knob 40 of the controller 10 is used to select a desired percentage power output, for instance, about 40%. Using this particular power supply, the 40% desired power level limits output power to 60 amperes on a 100% duty cycle, each heating pad drawing a nominal 30 amperes. Both controller 10 and applications power supply 22 are then switched on.

The temperature of workpiece 12 is then sensed and compared to the desired temperature, and comparator 34 output a signal if the sensed temperature is less than the desired temperature (e.g., a "difference" signal). The current of that difference signal output by comparator 34 is then limited to a level proportional to the 40% desired power level of applications power supply 22 and then transmitted to applications power supply 22 to switch the power supply on. Depending upon the circuitry of comparator 34 (see above), the sensed temperature of workpiece 12 and the desired temperature are either compared continuously or at regular intervals until they are approximately equal, at which time applications power supply 22 is turned off when comparator 34 ceases outputting the difference signal. As noted above, by activating the timer-controlled switch 50, applications power supply 22 is optionally switched between first and second power levels at a desired frequency.

Although heating element 14 is shown as a ceramic heating pad, it is not intended that the apparatus of the present invention be so restricted. Instead, any electrically operated heating element such as a finger element, braided heater, or electrically operated infrared heater, may be used to advantage as a heating element in connection with the present invention. Further, it will be apparent that the applications power supply 22 is also capable of being used to power a heating element 14 which is used to heat the air inside a closed metal workpiece, such as a boiler or reaction vessel, to heat treat in a manner similar to the heating of an oven under the control of controller 10. As noted above, the heating need not be restricted to heat treating operations, it being an advantageous use of controller 10 of the present invention to provide heat for thawing, increasing the fluidity, or preventing freezing, of the contents of a metal container, or conduit. Other modifications to the specific embodiment described herein will be apparent to those skilled in the art, and all are intended to fall within the spirit and scope of the following claims.

What is claimed is:

1. An apparatus for controlling the heating of metal to a desired temperature comprising:
    means for sensing the temperature of the metal to be heated and outputting a signal proportional thereto;
    a first connector for receiving input power from an external power source;
    means operating on the power received from said first connector and receiving the signal from said temperature sensing means for outputting a signal responsive to the difference between a desired temperature and the temperature sensed by said sensing means to turn an applications power supply that powers a heating element on and off;
    means for limiting the current of the signal from said signal outputting means and outputting a current limited signal proportional to a desired power level of the applications power supply to control the rate of heating of the metal by the heating element; and
    a second connector for transmitting the signal of said current limiting means to the applications power supply.

2. The apparatus of claim 1 wherein said signal outputting means outputs a low power signal from power received from said first connector and the applications power supply produces high power levels for powering the heating element.

3. The apparatus of claim 1 wherein said signal outputting means is programmable to begin operations at a predetermined time to heat the metal to a desired temperature at a desired rate.

4. The apparatus of claim 1 additionally comprising means for recording the duty cycle of the applications power supply or the output signal of said temperature sensing means.

5. The apparatus of claim 1 wherein the applications power supply is an inverter power supply.

6. The apparatus of claim 1 wherein said temperature sensing means is a thermocouple.

7. The apparatus of claim 1 wherein the heating element is a heating pad.

8. The apparatus of claim 1 additionally comprising means for switching between first and second current limited output signals at a selected frequency for pulsing the applications power supply.

9. An apparatus for use in stress relieving, or in a welding operation requiring pre-heating or post-heating of a metallic workpiece, wherein the metallic workpiece is heated to a desired temperature and held at or near the desired temperature for a desired period of time comprising:
    a temperature sensor for outputting a signal proportional to the temperature of a metallic workpiece;
    a first connector for receiving input power from a source of low power;
    a comparator operating on the low power received from said first connector and receiving the signal from said temperature sensor for outputting a signal responsive to a difference between a desired temperature and the temperature of the workpiece to turn on a high applications power supply that powers a heating element, thereby increasing the temperature of the workpiece;
    means for limiting the current of the signal from said comparator and for outputting a signal proportional to a desired power level of the applications power supply to control the rate of heating of the workpiece by the heating element; and
    a second connector for transmitting the signal of said current limiting means to the applications power supply.

10. The apparatus of claim 9 additionally comprising programmable means for beginning operations at a predetermined time to heat the workpiece at a desired rate to a desired temperature for a desired period of time.

11. The apparatus of claim 9 wherein said comparator produces low voltage output signal and the applications power supply is capable of producing power having a current as high as several thousand amperes.

12. A method for controlling the heating of a metal to a desired temperature comprising the steps of:
    selecting a temperature to which it is desired to heat a metallic workpiece;
    sensing the temperature of the workpiece;
    comparing the sensed temperature of the workpiece to the desired temperature;
    outputting a signal if the sensed temperature is less than the desired temperature;
    limiting the current of the output signal to a level proportional to a desired power level of an applications power supply; and
    transmitting the current limited output signal to the applications power supply to switch the applications power supply on to heat the workpiece.

13. The method of claim 12 wherein the applications power supply powers a heating element.

14. The method of claim 12 additionally comprising beginning the steps of the method at a predetermined time with a preselected desired temperature and a preselected desired power level under control of a programmable means.

15. The method of claim 12 additionally comprising turning the applications power supply off when the sensed temperature of the workpiece is approximately equal to the desired temperature.

16. The method of claim 12 wherein the applications power supply produces high current power and is turned on by the current limited, low power signals.

17. The method of claim 16 wherein the high current power is in the range of thousands of amperes.

18. The method of claim 12 wherein the temperature of the workpiece and the desired temperature are compared either continuously or at regular intervals.

19. The method of claim 12 wherein different current limited output signals are transmitted to the applications power supply to pulse the output power produced by the applications power supply.

20. The method of claim 19 additionally comprising switching back and forth between the different current limited output signals at a selected frequency.

* * * * *